March 10, 1931.   F. B. MONAR   1,795,343
PIEZO CRYSTAL CIRCUIT
Filed Feb. 15, 1927

Fred B. Monar
INVENTOR.

BY *Robert A. Lorrander*
ATTORNEYS.

Patented Mar. 10, 1931

1,795,343

UNITED STATES PATENT OFFICE

FRED B. MONAR, OF WASHINGTON, DISTRICT OF COLUMBIA

PIEZO CRYSTAL CIRCUIT

Application filed February 15, 1927. Serial No. 168,376.

(GRANTED UNDER THE ACT OF MARCH 3, 1883, AS AMENDED APRIL 30, 1928; 370 O. G. 757)

My invention relates to a vacuum tube oscillator of the so-called push-pull type, the frequency of which is maintained constant by the use of a piezo electric crystal.

An object of the invention is to provide a particular type of transmitter circuit that will permit the use of alternating instead of direct current for plate and filament voltage supply.

Another object is the employment of the alternating current source as a modulating potential in addition to its ordinary use of plate and filament energization.

A further object is to provide a circuit arrangement employing vacuum tube amplifiers in which both halves of the wave produced by the oscillation generator are made available for transmission, the frequency of the generated wave being strictly constant.

Further objects of my invention will appear more fully hereinafter.

It has been customary up to the present time to employ direct current as a source of current supply for the plate and grid circuits of piezo electric crystal controlled vacuum tube transmitters. This mode of energization, however, has the disadvantage of requiring two distinct sources of electromotive force when batteries are used and in case of a generator, necessitates a complicated armature structure having a low voltage tap. Furthermore, the low frequency required for modulation must be obtained from an alternator which is additional to the machine furnishing the supply of direct current.

My invention, however, contemplates a single source of alternating current, the connections thereto being arranged to provide all the energy required for complete operation of a piezo electrically controlled vacuum tube generator of modulated high frequency. Since the adaptation of the common source of electromotive force to the system set forth, is obtained by an arrangement of circuits wholly exterior to said source, no specially constructed alternator is required.

Figure 1:
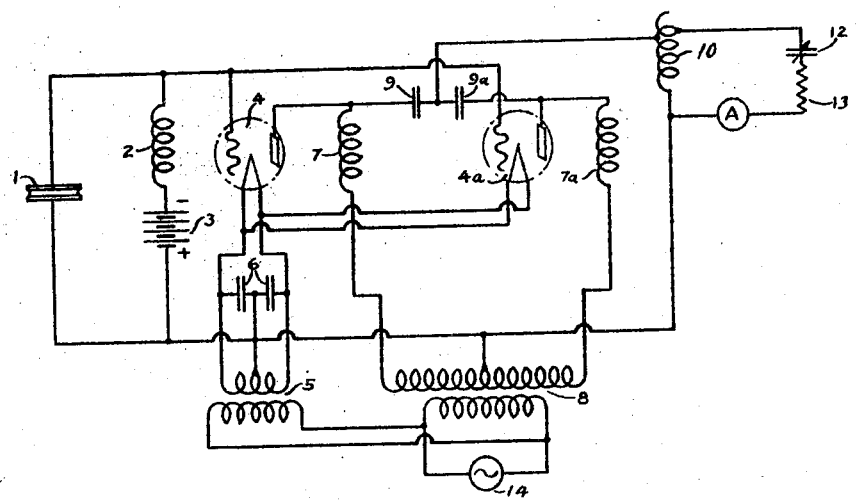
Figure 2:
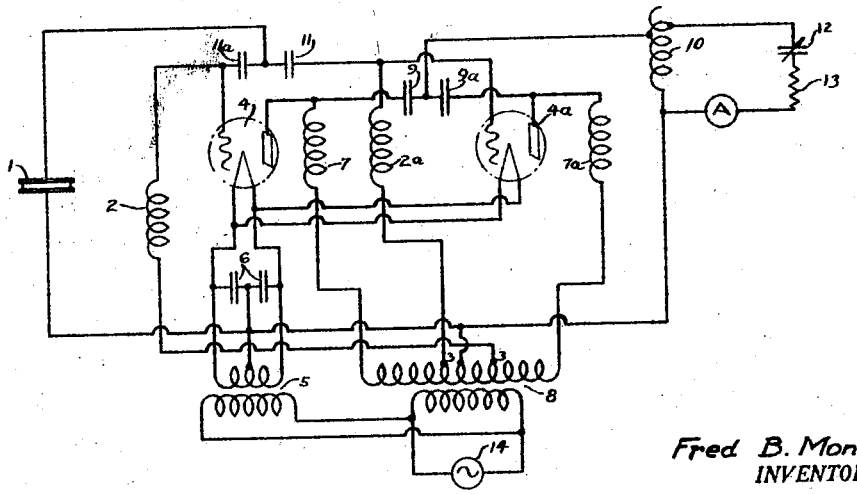

The various features of the invention will be understood by reference to the following description taken in connection with the accompanying drawing wherein:

Figure 1 represents two oscillation generators arranged in push-pull relation and utilizing alternating current energization in entirety but for the grid biasing potential which is direct current, Figure 2 is similar to Figure 1 except that the grid bias potential is also derived from the common alternating current source.

In Figure 1, numeral 1 designates a crystal, exhibiting piezo electric characteristics shunted across a circuit containing radio frequency chokes 2, and grid-biasing battery 3. 4 and 4a represent two three-electrode vacuum tubes, the grids, plates and filaments of which are connected by pairs of corresponding electrodes to form a push-pull unit, the operation of which is well known in the art. The input circuit of this unit includes the crystal element while the common output circuit includes inductance 10 across the terminals of which is shunted a load, i. e. a transmitting antenna, or other form of energy dissipator, shown for example as adjustable condenser 12 and resistance 13.

For energizing the tubes, I utilize a source of alternating current 14 having a frequency suitable for modulation purposes. This source, being of standard voltage, necessarily has to be transformed for adaptation to the voltage requirements of the plate and filament circuits. For this purpose I provide two transformers 5 and 8 connected in parallel to said source, one shown to step down the voltage for the cathode and the other as of the step up type to furnish the high voltage plate current.

I prefer to use an alternator generating a mean effective voltage of 110 and having a frequency of 500 cycles per second, this periodicity having been found to be suitable for modulation purposes. The opposite terminals of the secondary of transformer 5 are connected to each of the two cathodes and a midpoint tap is taken from the secondary to complete the input circuit. Condensers 6 of a size to readily pass high frequency current is interposed between the mid-point connection and both sides of the filament circuit. The secondary of transformer 8 has also a midpoint tap to which is connected the common output circuit. The terminals of this secondary are electrically joined to the plates of tubes 4 and 4a through radio frequency chokes 7 and 7a. At 9 and 9a, I have indicated two condensers allowing passage of high frequency current and located on either side of the common output circuit junction point, the purpose being to prevent a substantial short-circuit between the midpoint tap and each of the terminals of transformer secondary 8. As shown in Figure 1, source of electromotive force 3 is of such magnitude and polarity as to permit tubes 4 and 4a to operate at their optimum efficiency.

In practice, condenser 12 usually located in the antenna circuit is adjusted to tune the common output of the amplifiers to that of the input circuit including the piezo electric crystal. As is well understood in the art under these conditions oscillations will be developed of a frequency dependent upon the constants of all associated circuits, the differential tube unit operating to deliver a continuous wave modulated in accordance with the low frequency current used in conjunction with filament and plate energization. It is obvious that if communication is to be had by interrupted carrier, instead of utilizing the modulation effect, a key may be necessary having a preferable position in the common output circuit. It is usual, however, to couple one or more power amplifier stages to the oscillation generator in which case, the signaling key may be conveniently located in any one of the amplifier input circuits. I have not illustrated this arrangement as it is well known in the art and constitutes a system wholly exterior to my invention.

In Figure 2, I show a method of deriving the grid biasing potential by means of taps 3 taken from the secondary of transformer 8, that supplies potential to the plate circuits. It will be noted that for a given tube, the grid tap is on the opposite side of the midpoint of secondary than that to which the plate electrode of the same tube is connected. The instantaneous polarities of the plate and grid are such that as the former is positive, i. e. causing passage of plate current, the grid corresponding thereto, automatically becomes negative thereby performing the same function as the negative direct current bias illustrated in Figure 1.

This manner of biasing the grid necessitates the use of two condensers 11 and 11a, affording passage of radio frequency current, arranged on either side of the junction point from which connection is made to the upper electrode of crystal 1.

It will be noted that upon completion of all circuits, high frequency oscillations will be developed in the inductance of load circuit 10. The piezo electric crystal connected directly across the input circuit of both tubes will operate to cause the latter to deliver current of constant frequency. The alternating current energization source of the plate circuit is such as to impress amplitude variations of relatively low frequency upon the high frequency oscillations developed in the system. The wave emitted by the load antenna may be readily detected by circuits operating on the homodyne or hetrodyne principles.

It will be understood that the above description and accompanying claims comprehend only the general embodiment of my invention and that various changes in minor details of construction, proportion and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

What I claim is as follows:

1. In an oscillation generating system having a pair of vacuum tubes, each tube having an anode, a cathode and a control electrode; a source of alternating current voltage for said tubes, connections for applying said voltage across the anode and cathode of each tube in opposite phase relation, an oscillatory circuit coupled to the anodes of said tubes and piezo-electric means for controlling the potential of said control electrodes of said tubes to control the frequency of the alternating current generated by said tubes.

2. In an oscillation generating system having a pair of vacuum tubes, each tube having an anode, a cathode and a control electrode; a source of alternating current for supplying current to the cathode, and the anode-cathode circuits of said tubes, connections for applying said voltage across the anode and cathode of each tube in opposite phase relation, an oscillatory circuit coupled to the anodes of said tubes and piezo-electric means for controlling the potential of said control electrodes of said tubes to control the frequency of the alternating current generated by said tubes.

3. In an oscillation generating system having a pair of vacuum tubes; each tube having an anode, a cathode and a control electrode;

a source of alternating current for supplying current to the cathode and the anode-cathode circuits of said tubes, connections for applying said voltage across the anode and cathode of each tube in opposite phase relation, an oscillatory circuit coupled to the anodes of said tubes, and a single piezo-electric crystal for controlling the potential of both of said control electrodes of said tubes to control the frequency of the alternating current generated by said tubes.

FRED B. MONAR.